United States Patent Office 3,579,552
Patented May 18, 1971

3,579,552
PRODUCTION OF CARBOXYLIC ACIDS
John H. Craddock, Ballwin, and Arnold Hershman, Creve Coeur, Mo., Frank E. Paulik, Houston, Tex., and James F. Roth, Creve Coeur, Mo., assignors to Monsanto Company, St. Louis, Mo.
No Drawing. Filed Aug. 15, 1968, Ser. No. 752,746
Int. Cl. C08h *17/36*
U.S. Cl. 260—413
25 Claims

ABSTRACT OF THE DISCLOSURE

The present invention relates to a process for the preparation of carboxylic acids, specifically by the reaction of ethylenically unsaturated compounds with carbon monoxide and water, in the presence of catalyst compositions essentially comprising rhodium compounds and complexes, together with an iodide promoter.

This invention relates to a process for the preparation of carboxylic acids. More particularly, it relates to a process for the reaction of ethylenically unsaturated compounds with carbon monoxide and water in the presence of catalyst compositions essentially comprising rhodium compounds and complexes and an iodide promoter to yield carboxylic acids selectively and efficiently.

Processes for the preparation of carboxylic acids from olefins, and other ethylenically unsaturated compounds, carbon monoxide and water are well known in the art and have been directed to the production of carboxylic acids and ester derivatives. The prior art teaches the use of a number of catalysts for the synthesis of carboxylic acids by reaction of olefins with carbon monoxide and water at elevated temperatures and pressures. Catalysts such as phosphoric, boric, arsenic and monochloroacetic acids; acetyl chloride on active carbon; boron trifluoride; barium and calcium halides; salts and carbonyls of nickel and cobalt, especially halides; and in general, the Group VIII metals, and simple salts, carbonyls and complexes; have been reported to function for the production of carboxylic acids and esters by reaction of olefins and carbon monoxide in the presence of water or other hydroxylic compounds at temperatures from 130° C.–375° C. and pressures up to 1,000 atmospheres. However, even under such severe conditions the yields of acid were substantially poor, and, therefore, uneconomical. Somewhat less severe reaction conditions of temperature and/or pressure have been reported in the literature employing specific catalyst compositions, e.g., 200° C. to 300° C. and 150 to 200 atmospheres in the presence of 87% phosphoric acid; 300° C. to 375° C. and 450 to 740 atmospheres in the presence of nickel carbonyl promoted by nickel chloride and hydrochloric acid; or 85° C. to 250° C. and 100 to 1,000 atmospheres in the presence of palladium phosphine complex catalysts.

Even using the prior art specific catalyst compositions and reaction conditions, substantially poorer yields of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity. One particular disadvantage of olefin carbonylation processes of the prior art is their dependence upon the use of catalysts comprised of metal carbonyls or certain modified metal carbonyls including dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3,000 p.s.i.g. to 10,000 p.s.i.g. under normal carbonylation conditions of 175° C. to 300° C.

Still another disadvantage of carbonylation processes for ethylenically unsaturated compounds disclosed in the prior art is their relatively low level of activity. This low level of activity requires higher catalyst concentrations, longer reaction times, higher reactor pressures, and higher temperatures to obtain substantial reaction rates and conversions. Consequently, very large and costly processing equipment is required.

Another disadvantage of carbonylation processes disclosed heretofore, which employ feedstocks having ethylenically unsaturated linkages, is their inability to maintain high selectivity to the desired carboxylic acid at temperatures required for high conversion levels and high reaction rates. At these higher temperatures undesirable by-products comprising substantial amounts of ethers, aldehydes, higher carboxylic acids and alcohols, carbon dioxide, methane and water are formed, thereby resulting in substantial yield losses and necessitating additional product purification and recycle steps in the processing.

It is, therefore, an object of the present invention to overcome the above disadvantages and thus provide an improved and more economically and commercially feasible carbonylation process for the production of organic acids from ethylenically unsaturated compounds, in liquid phase and vapor phase processes.

Another object of this invention is to provide a more reactive and more stable carbonylation catalyst composition than has been heretofore described in the prior art.

Still another object of the present invention is to provide a more selective and more reactive carbonylation catalyst composition for the production of carboxylic acids from ethylenically unsaturated compounds.

Another object of the present invention is to provide a carbonylation catalyst composition which results in the production of a higher yield of the desired carboxylic acid with no substantial formation of ethers, aldehydes, higher carbon number carboxylic acids and alcohols, carbon dioxide, methane, water and other undesirable by-products.

Still another object of the present invention is the provision of an improved carbonylation process enabling the efficient and selective production of carboxylic acids by reaction of ethylenically unsaturated compounds with carbon monoxide and water in the presence of an improved and more stable catalyst, thus enabling the use of lower catalyst, concentration, lower temperature, lower pressure, and shorter contact time than has been generally possible heretofore and faciiltating product isolation, catalyst recovery and recycle without substantial catalyst decomposition and loss. The present catalyst may be employed using a solution of the catalyst (liquid phase operation) or a solid catalyst (vapor phase operation).

In accordance with the present invention, ethylenically unsaturated compounds are converted selectively to carboxylic acids by reaction in the liquid phase or vapor phase with carbon monoxide and water at temperatures from about 50° C. to 300° C., preferably 125° C. to 225° C., and at partial pressures of carbon monoxide from 1 p.s.i.a. to 15,000 p.s.i.a., preferably 5 p.s.i.a. to 3,000 p.s.i.a., and more preferably 25 p.s.i.a. to 1,000 p.s.i.a., although higher pressure may be employed, in the presence of a catalyst system comprised of a rhodium containing component, and a promoter portion, i.e., an iodide. The iodide may be derived from iodine or iodine compounds. The present process is particularly advantageous at lower pressures, although higher pressures may also be used.

As referred to above, for the purpose of the present invention, the catalyst as charged to the reactor is a solution containing a rhodium component, an iodide (or iodine) promoter, and other moieties if desired. The catalyst essentially includes a rhodium component which may contain the promoter, as the active component, such as

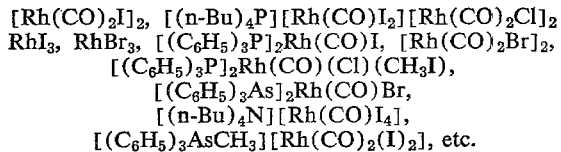

The promoter portion of the catalyst system may or may not be catalytically active in itself, but promotes the reaction in various ways, such as by facilitating formation of the carbon-metal sigma bond, or by rendering the rhodium species less volatile than the unmodified rhodium carbonyl.

The active catalytic portion or first component of the catalyst is prepared from rhodium species such as rhodium metal, simple rhodium salts, organorhodium compounds, and coordination compounds of rhodium, specific examples of which may be taken from the following partial list of precursors, by suitable chemical and/or physical treatment of the rhodium precursor as discussed below in order to render the rhodium moiety in the proper valence state and ligand environment. For example, rhodium complexes containing stable chelating ligands, such as tris-acetylacetonato rhodium (III), may be treated chemically to remove or destroy the bidentate chelate ligands in order that transformation to the proper valence state and monodentate ligand configuration can be accomplished.

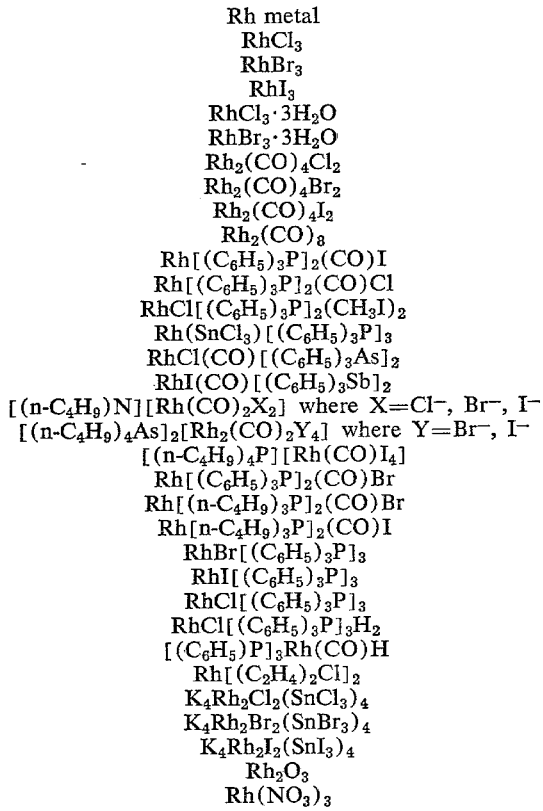

The active catalytic portion or primary component of the catalyst system of this invention may exist as a coordination compound of rhodium, carbon monoxide, and iodide, $[Rh^{+1}(CO)_x(I)_y]$ where $x+y=4$, including both neutral and ionic complexes, or a coordination compound $[Rh^{+3}(CO)_x(I)_y(Z)_q]$ where $x+y+q=5$ or 6, which includes other suitable monodentate ligands (Z), if desired, such as amine, organophosphine, organoarsine, and/or organostibine ligands, other ligands, e.g., hydride, alkyl, acyl, and aryl (1–20 carbon atoms) moieties; and trihalostannate or any neutral, cationic, or anionic monodentate moiety necessary to satisfy the coordination number of the central metal atom, rhodium, and thus form a coordination compound or complex of rhodium as described above.

Preferred catalyst sysems for the process of this invention are typically coordination complexes of rhodium, with monodentate ligands, carbon monoxide and iodide, such as $[Rh(CO)_2I_2]^-$, $[Rh(CO)I_4]^-$, or $Rh(CO)_2I]_2$.

The term coordination compuond or coordination complex used throughout this specification means a compound or complex formed by combination of one or more electronically rich molecules or atoms capable of indepndent existence with one or more electronically poor molecules or atoms, each of which may also be capable of independent existence.

The promoting portion or second component of the catalyst system as discussed herein consists of iodide and may be supplied as the free halogen or halogen compound such as hydrogen halide, alkyl- or aryl-halide (preferably having the same number of carbon atoms as the feedstock), metal halide, ammonium, phosphonium, arsonium, stibonium halide, etc., and may be the same or different from any halogen component already present in the precursor rhodium component of the catalyst system. Iodine or iodide compounds are suitable for the promoter portion of the catalyst, but those containing iodide are preferred, with hydrogen iodide constituting a more preferred member. Accordingly, suitable compounds providing the promoter portion of the catalyst system of this invention may be selected from the following list of preferred iodine and/or iodine containing compounds:

$$RI_n$$

where $n$ is 1–3

R= any alkyl-, alkylene or aryl- group e.g., $CH_3I$, $C_6H_5I$, $CH_3CH_2I$, $ICH_2CH_2I$, etc.

Other examples include $I_2$; $I_3^-$; HI; and

where

R=any alkyl- or aryl-group e.g.,

$R_4MI$, $R_4MI_3$, or $R_3MI_2$ where

R=hydrogen or any alkyl- or aryl-group e.g., $NH_4I$, $PH_4I_3$, $PH_3I_2$,

M=N, P, As or Sb $(C_6H_5)_3PI_2$, and/or combinations of R, M and I

The promoter portion or second component of the catalyst may alternatively be charged to the reactor separately from the active catalyst or first component, or it may be incorporated into the active component, e.g., $RhI[(C_6H_5)_3P]_3$ or $RhI_3$.

The preparation of the active catalyst complex which includes both rhodium and iodide promoter components may be accomplished by a variety of methods. However, it is thought that a substantial part of the precursor rhodium component is converted to the monovalent state during the preparative treatment. In general, in the process of this invention, it is preferable to preform the active carbonylation catalyst system which contains both rhodium and iodide promoter components. For example, to prepare the catalyst system, the first component of the catalyst system, e.g., finely divided rhodium metal (powder), a simple rhodium salt or rhodium compound as a precursor is dissolved in a suitable medium, and carbon monoxide is bubbled through the above rhodium solution, preferably while maintaining gentle heating and stirring of the rhodium solution. Then an acidic solution of the desired promoter source is added to form an active catalytic solution containing the necessary rhodium and iodide promoter components.

Generally, the active catalyst containing the rhodium and promoter components of the catalyst system of this invention may be preformed prior to charging the reactor, or it may be formed in situ in the reactor as discussed above. For example, to prepare the catalyst system, the first component of the catalyst system, e.g., a rhodium salt such as $RhCl_3 \cdot 3H_2O$ is dissolved in a suitable solvent such as ethanol. Subsequently, carbon monoxide is bubbled through the solution where an intermediate, such as the dimer $[Rh(CO)_2Cl]_2$, is produced wherein the rhodium is in the monovalent state. The second or promoter component is, for example, added to the above solution; e.g., as aqueous HI, elemental iodine, alkyl iodide (with alkyl radicals of 1 to 30 carbon atoms) or other iodine containing compound.

Alternatively, the rhodium precursor, e.g., $RhCl_3 \cdot 3H_2O$ or $Rh_2O_3 \cdot 5H_2O$, may be dissolved in a dilute aqueous acid solution, e.g., HCl, acetic acid, etc., as solvent. Then the solution of the rhodium compound is heated, for example, to 60° C.–80° C., or in general at a temperature below the boiling point of the solvent, with stirring. A reducing agent such as carbon monoxide is bubbled through the said solution to obtain the rhodium component at least in part in the monovalent state. Subsequently, the iodine promoter is added as described herein, although the iodine containing promoter may also be added first.

Another embodiment of the present invention employs compounds of monovalent rhodium initially, wherein the transformation to active catalyst does not involve a change of valence. For example, monovalent rhodium salts such as $Rh[(C_6H_5)_3P]_3Cl$, $[Rh(C_6H_5)_3P]_2(CO)Cl$, $[Rh(C_6H_5)_3P]_3H$ and $[Rh(CO)_2Cl]_2$ are dissolved in a suitable solvent and carbon monoxide is subsequently passed through a solution that is preferably warmed and stirred. Subsequent addition of an acidic solution of the halogen promoter, e.g., alkyl iodide, elemental iodine, aqueous HI, etc., results in formation of an active carbonylation catalyst solution containing the necessary rhodium and iodide components.

Alternate embodiments of the present invention include use of other rhodium components in various oxidation states and ligand environments, e.g., rhodium metal (zero valence state), rhodium salts, e.g., $RhI_3$(+3 valence state), other rhodium compounds, e.g., tris-acetylacetonato rhodium (III) (+3 valence state), etc.; with suitable chemical reagents to accomplish the desired transformation to the monovalent rhodium state and desired monodentate ligand environments. Such reagents include reducing agents, e.g., hydrogen, carbon monoxide, hydrazine, formic acid, phenylhydrazine, etc.; and oxidizing agents, e.g., elemental halogens ($I_2$ or $Br_2$), mineral acids, (HCl, HBr, $HNO_3$, HI), peroxides ($H_2O_2$, cumene hydroperoxide, etc.).

This catalytic solution containing the necessary rhodium and iodide components is then ready for use as discussed above, and may be employed as a liquid phase or vapor phase catalyst. Often it may be beneficial and desirable to have the concentration of the second component or promoter portion of the catalyst system, for example, iodide such as HI or $I_2$, in excess of that required to form a stoichiometric compound such as described above. In the same way the two components, e.g., a rhodium compound and an iodine component are provided in a single molecule by beginning with rhodium triiodide as the catalyst precursor for the reaction of an ethylenically unsaturated compound with carbon monoxide and water to produce an organic acid. The present discussion is based upon the catalyst precursors as charged. The ultimate nature of the catalyst as modified by reaction conditions, and the presence of promoters and reactants has not been completely elucidated. However, it has been found that the use of the components described herein provides a highly superior catalyst and process for the production of carboxylic acids.

Although any ratio of promoter portion or second component of the catalyst system may be employed, ratios of promoter portion to active portion expressed as atoms of halogen in the promoter portion to atoms of rhodium in the active portion of the catalytic system in the range of 1:1 to 2500:1 are generally employed. However, the preferred range is 3:1 to 300:1 halogen atoms per rhodium atom.

The liquid reaction medium employed may be any solvent compatible with the catalyst system and may include pure olefins, or mixtures of an olefin feedstock and/or the desired carboxylic acid and/or other carboxylic acids such as acetic acid. The preferred solvent and liquid reaction medium for the process of this invention is a monocarboxylic acid having 2–20 carbon atoms, e.g., acetic, propionic, nonanoic, naphthoic and elaidic acids, including isomeric forms. Water may also be added to the reaction mixture to exert a beneficial effect upon the reaction rate.

The present invention is based upon the production of carboxylic acids by the transformation of an ethylenically unsaturated compound, having from 2 to 30 carbon atoms, and containing the structural unit

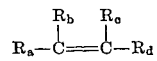

in heterocyclic, heteroaliphatic, aliphatic, acyclic, cyclic, or polycyclic hydrocarbon form, where $R_a$, $R_b$, $R_c$ and $R_d$ are moieties having from 0 to 20 carbon atoms and being selected from the group consisting of hydrogen, halogen, alkyl, alkene, aryl, cycloalkyl and cycloalkene moieties, the said hetero compounds being substituted with nitrogen, phosphorus, sulfur or oxygen atoms.

Suitable feedstocks in the process of this invention are any ethylenically unsaturated compounds. Suitable compounds and mixtures include ethylene, propylene, butenes; hexenes; octenes; hexadecene; 2-methylpropene; 1,3-butadiene; 2-methyl-1,3-butadiene; 2,3-dimethyl-1,3-butadiene; cyclohexene; methyl-cyclohexene; styrene; methylstyrene; vinylcyclohexene; 3,3-dimethyl-1-butene; 1,4-hexadiene; 2,4-hexadiene; 1,5-hexadiene; 2-methyl-1,4-hexadiene; acrolein; methyl vinyl ketone; allyl alcohol; 2-phenylbutene; cyclopentadiene; 2-cyclohexylbutene; allene; allylamine; diallylamine; acrylonitrile; methyl acrylate; vinyl chloride; phosphopyruvic acid; and mixtures thereof. Other suitable feedstocks include compounds having cyclic and polycyclic structures containing, in part, an ethylenically unsaturated linkage which may be converted to a carboxylic acid by the process of this invention. Examples of suitable cyclic structures include 1,5-cyclooctadiene; 1,5,9-cyclododecatriene; furan; 1,2-dithiol; pyrrole and

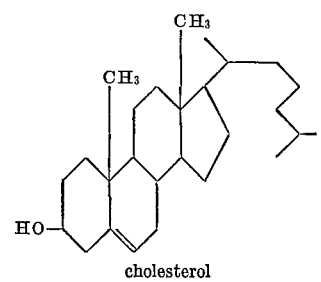

cholesterol        α-terpineol

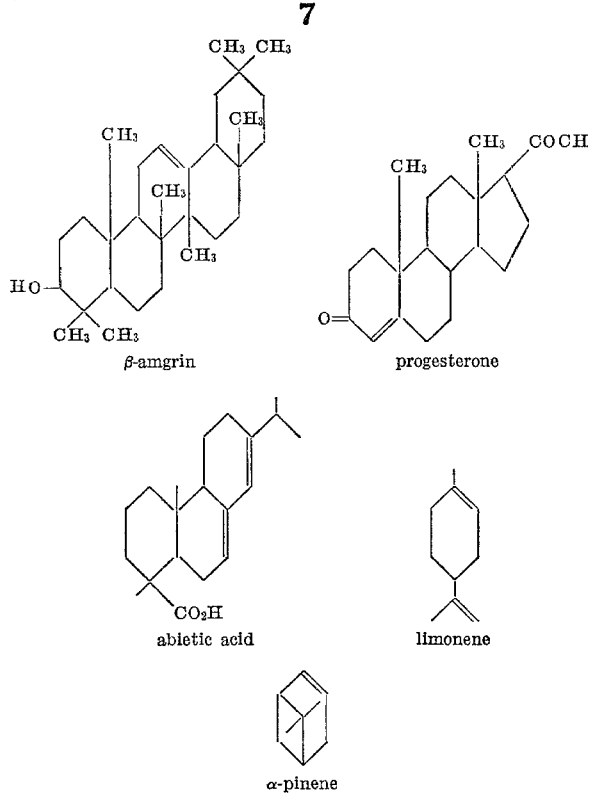

In accordance with the present invention, the carbonylation reaction may be carried out by intimately contacting an ethylenically unsaturated compound, which depending on the carbon number and operating conditions, may either be in the vapor or liquid phase, with gaseous carbon monoxide and water (vapor or liquid) in a liquid phase containing the catalyst system prepared from $RhCl_3 \cdot 3H_2O$ or other rhodium precursor, preferably in the presence of iodine containing promoter, such as hydrogen iodide, under conditions of temperature and pressure suitable as described herein to form the carbonylation product. The particular conditions selected are the same whether the olefin is charged as a vapor or liquid. The temperature accordingly will be in the range of 50° C. to 300° C. with the preferred range being 125° C. to 225° C. Partial pressures of carbon monoxide of the order of 1 p.s.i.a. to 15,000 p.s.i.a. may be employed; however, 25 p.s.i.a. to 1,000 p.s.i.a. carbon monoxide partial pressure is generally preferred. Higher pressures may be used if desired under appropriate conditions.

Alternatively, carboxylic acids may be produced if desired via reaction of ethylenically unsaturated compounds with carbon monoxide and water in the vapor phase over the rhodium containing catalyst systems described above, dispersed upon inert supports. Such a catalyst system may be operated as a conventional fixed bed catalytic reactor. For example, ethylene, aqueous hydrogen iodide, and carbon monoxide may be passed over a catalyst system consisting, for example of $[Rh(CO)_2Cl]_2$ dispersed on an inert support material such as Alundum, activated carbon, clays, alumina, silica-alumina, and ceramics, etc., in a fixed bed reactor maintained at elevated temperature and pressure, as described above, to produce propionic acid in high yields. However, use of a liquid reaction medium is preferred in the process of this invention using dissolved or dispersed active catalytic and promoter components.

A typical carbonylation reaction selective to carboxylic acid requires at least one mole of carbon monoxide and one mole of water per mole (equivalent) of ethylenically unsaturated linkage reacted. Excess of carbon monoxide and water over the aforesaid stoichiometric amounts, however, may be present. Carbon monoxide streams containing inert impurities such as carbon dioxide, methane, nitrogen, noble gases and paraffinic hydrocarbons, having from 1 to 4 carbon atoms, may be employed, if desired, for example from an available plant gas stream, with no ill effect; however, in such cases total reactor pressure will have to be increased to maintain a desired carbon monoxide partial pressure. The concentration of carbon monoxide in the feed gas mixture is from 1 vol. percent to 99.9 vol. percent, a preferred range being from 10 vol. percent to 99.9 vol. percent.

The reaction rate is dependent upon catalyst concentration and temperature. Concentrations of the rhodium compound or the first component of the catalyst system in the liquid phase, between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The concentration of the second component or promoter portion of the catalyst system may vary widely over the broad concentration range of $10^{-6}$ moles/liter to 18 moles/liter, based on halogen atom. In the process of this invention, however, the preferred concentration range of promoter is $10^{-4}$ moles/liter to 2 moles/liter of catalyst solution.

The active rhodium catalytic component is preferably supplied as a catalyst solution. The solution can also include liquid reactants, products and mixtures thereof which function as solvents or reaction media.

The ethylenically unsaturated feedstock is normally charged with equimolar amounts of water, although more water may be used. The use of ethylenically unsaturated linkage compounds in the above ratios is on the basis that at least a molar quantity of water is present equivalent to the number of moles of ethylenically unsaturated linkage reacted. It has been found that excess water generally exerts a beneficial effect on the rate of reaction. However, adding water, with the feed in excess of the equimolar quantity, e.g., an excess of 10% to 300% of such equimolar quantity, already present with the feedstock, as discussed above, promotes the production of carboxylic acid.

The rhodium catalysts of the present invention are characterized by a high degree of specificity for the carbonylation reaction, e.g., the reaction of ethylenically unsaturated linkage compounds with carbon monoxide and water to obtain carboxylic acids. Such control over the various competing reactions to obtain the carboxylic acid in high yield is surprising since other metal catalysts do not show such specificity. The iron group metals such as iron, cobalt and nickel differ from the present rhodium catalysts in that the iron group metals also produce a number of oxygenated products such as alcohols, aldehydes, and ketones in addition to carboxylic acid. Furthermore, the iron group catalysts, particularly cobalt and nickel, require a far higher carbon monoxide partial pressure to remain stable. When moderate pressures, e.g., less than about 2,000 p.s.i.a. carbon monoxide partial pressure are employed, at a temperature of 175° C., the cobalt and nickel catalysts are found to plate out or decompose to the free metal which plates on the walls of the reactor and is thus lost as a catalyst.

Another distinction of the rhodium catalysts over the cobalt catalysts is the elimination of undesirable gaseous by-products, including carbon dioxide and methane which are obtained as a result of the water-gas shift reaction which is strongly catalyzed by cobalt.

Another distinction of the present process over prior art processes is that hydrogen is not employed with the ethylenically unsaturated feedstock, and consequently aldehydes and alcohols are not produced as in hydroformylation processes.

For a better understanding of the process of the present invention specific embodiments of the process are presented below. These examples and illustrations are not to be

EXAMPLE 1

A Hastelloy C batch reactor is charged with the following ingredients: 0.10 gram of a rhodium compound having the formula $RhCl_3 \cdot 3H_2O$ as catalyst precursor; 6.6 ml. of a promoter component consisting of 57 wt. percent aqueous hydriodic acid (thereby providing a stoichiometric excess of water); 69 ml. of glacial acetic acid as solvent; and 14 grams of propylene having the structural formula $CH_2{=}CHCH_3$ as feedstock. The reactor is pressurized with carbon monoxide to a total pressure of 720 p.s.i.a., corresponding to a carbon monoxide partial pressure of about 300 p.s.i.a. at the reaction temperature of 175° C. The reaction is carried out at constant pressure.

The reaction mixture is subsequently analyzed by gas chromatographic techniques to yield a solution containing (solvent and catalyst-free bases):

| | Wt. percent |
|---|---|
| 2-iodopropane | 19 |
| Isobutyric acid | 50 |
| n-Butyric acid | 31 |

The selectivity to the desired carboxylic acid product (defined as moles of carboxylic acid/total moles of olefin and/or olefin derivative consumed×100) is greater than 99 mol percent at substantially 80% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

The above experiment is repeated in separate tests except that the rhodium component is supplied from several different compounds (on a molar equivalent basis):

$Rh_2O_3$
$[Rh(CO)_2Cl]_2$
$Rh(CO)Cl(P\varphi_3)_2$
$RhH(P\varphi_3)_3$
$[Rh(CO)_2Br]_2$
$[\varphi_4As^+] [Rh(CO)_2Cl_2^-]$
$[\varphi_4As^+] [Rh(CO)_2I_2^-]$ (where $\varphi$ is the phenyl group). Similar reaction rates and product distributions are obtained in all instances, indicating that the various sources of rhodium component give equivalent results When this experiment is conducted with the equivalent molar quantity of cobalt chloride instead of rhodium chloride as the catalyst, the selectivity and yield of the desired acid product are decreased significantly. It has been found that cobalt catalysts differ radically from rhodium catalysts in that the cobalt catalysts also cause hydrogenation reactions such as hydrogenation of the desired carboxylic acid product to aldehydes and alcohols of the same number of carbon atoms. Consequently, the use of cobalt catalysts results in the substantial production of various undesirable by-products including higher carbon number alcohols, carboxylic acids, and derivatives.

Still another distinction of the rhodium catalysts compared to the cobalt and nickel catalysts is the fact that significantly lower carbon monoxide partial pressures can be used without encountering catalyst decomposition.

EXAMPLE 2

A glass lined reactor is charged with the following ingredients: 0.10 gram of a rhodium compound having the formula $RhCl_3 \cdot 3H_2O$, as catalyst precursor; 9 ml. of a promoter component consisting of 47 wt. percent aqueous hydriodic acid; 66 ml. of glacial acetic acid as solvent; and 7 grams of ethylene having the structural formula $H_2C{=}CH_2$ as feedstock.

The reactor is pressurized with carbon monoxide to a total pressure of 700 p.s.i.a., corresponding to a carbon monoxide partial pressure of about 225 p.s.i.a. at the reaction temperature of 175° C. The reaction is carried out at constant pressure.

The reaction mixture is subsequently analyzed by gas chromatographic techniques to yield a solution containing (solvent and catalyst-free bases):

| | Wt. percent |
|---|---|
| Ethyl iodide | 15 |
| Propionic acid | 85 |

The selectivity to the desired carboxylic acid product (defined as moles of carboxylic acid/total moles of olefin and/or olefin derivative consumed×100) is greater than 99 mol percent at substantially 85% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

When the above experiment is repeated except that only the stoichiometric compound $RhI_3$ (2.4 g. of freshly precipitated compound) which contains both the rhodium component, and iodide promoter component is employed, no appreciable reaction occurs in 17 hours. When an excess of iodide above the stoichiometric proportion is added, as 2.0 ml. of 57% aqueous HI to give a proportion of iodide promoter about 100% in excess of the stoichiometric proportion of $RhI_3$, the reaction initiates immediately and continues at a fast rate as determined by carbon monoxide gas consumption. Analysis of the reaction mixture by gas chromatography gives a similar product distribution as described above.

EXAMPLE 3

An autoclave is charged with the following ingredients: 0.133 gram of a rhodium compound having the formula $RhCl_3 \cdot 3H_2O$ as catalyst precursor; 8.8 ml. of a promoter component consisting of 57 wt. percent aqueous hydriodic acid; 66 ml. of glacial acetic acid as solvent; and 16.8 grams of hexene-1 having the structural formula $$CH_3(CH_2)_3CH{=}CH_2$$

as feedstock.

The reactor is pressurized with carbon monoxide to a total pressure of 700 p.s.i.a., corresponding to a carbon monoxide partial pressure of about 600 p.s.i.a. at the reaction temperature of 175° C. The reaction is carried out at constant pressure.

The reaction mixture is subsequently analyzed by gas chromatographic techniques to yield a solution containing (solvent and catalyst-free bases):

| | Wt. percent |
|---|---|
| Hexenes | 15 |
| 2-iodohexane | 5 |
| Branched $C_7$ carboxylic acids | 58 |
| n-Heptanoic acid | 22 |

The selectivity to the desired carboxylic acid product (defined as moles of carboxylic acid/total moles of olefin and/or olefin derivative consumed×100) is greater than 99 mol percent at substantially 80% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

When the above experiment is repeated except that no HI is employed, no reaction occurs.

EXAMPLE 4

A Hastelloy B stirred batch reactor is charged with the following ingredients: 0.133 gram of a rhodium compound having the formula $RhCl_3 \cdot 3H_2O$ as catalyst precursor; 8.8 ml. of a promoter component consisting of 57 wt. percent aqueous hydriodic acid; 66 ml. of glacial acetic acid as solvent; and 16.7 grams of hexene-2 having the structural formula $CH_3(CH_2)_2CH=CHCH_3$ as feedstock.

The reactor is pressurized with carbon monoxide to a total pressure of 700 p.s.i.a., corresponding to a carbon monoxide partial pressure of about 600 p.s.i.a. at the reaction temperature of 175° C. The reaction is carried out at constant pressure. The reaction mixture is subsequently analyzed by gas chromatographic techniques to yield a solution containing (solvent and catalyst-free bases):

| | Wt. percent |
|---|---|
| Hexenes | 37 |
| Miscellaneous intermediates | 34 |
| Branched $C_7$ carboxylic acids | 23 |
| n-Heptanoic acid | 6 |

The selectivity to the desired carboxylic acid product (defined as moles of carboxylic acid/total moles of olefin and/or olefin derivative consumed×100) is greater than 99 mol percent at substantially 28% conversion level. No substantial amounts of other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

EXAMPLE 5

A batch reactor is charged with the following ingredients: 0.133 gram of a rhodium compound having the formula $RhCl_3 \cdot 3H_2O$ as catalyst precursor; 8.8 ml. of a promoter component consisting of 57 wt. percent aqueous hydriodic acid; 66 ml. of glacial acetic acid as solvent; and 20 grams of octene-1 having the structural formula $CH_2=CH(CH_2)_5CH_3$ as feedstock. This mixture provides the water content in 150 mol percent excess relative to olefin reacted.

The reactor is pressurized with carbon monoxide to a total pressure of 1,000 p.s.i.a., corresponding to a carbon monoxide partial pressure of about 550 p.s.i.a. at the reaction temperature of 200° C. The reaction is carried out at constant pressure.

The reaction mixture is subsequently analyzed by gas chromatographic techniques to yield a solution containing (solvent and catalyst-free bases):

| | Wt. percent |
|---|---|
| Octenes | 30 |
| Iodooctane | Trace |
| n-Nonanoic acid | 30 |
| Branched $C_9$ carboxylic acids | 40 |

The selectivity to the desired carboxylic acid product (defined as moles of carboxylic acid/total moles of olefin and/or olefin derivative consumed ×100) is greater than 99 mol percent at substantially 70% conversion level. No other organic oxygenated compounds such as alcohols, aldehydes, ketones, etc., are produced as determined by gas chromatographic analysis. No substantial amounts of other undesirable by-products such as methane, carbon dioxide, or higer carboxylic acids are formed.

EXAMPLE 6

A glass lined batch reactor is charged with the following ingredients: 0.10 gram of a rhodium compound having the formula $RhCl_3 \cdot 3H_2O$, as catalyst precursor; 17.4 grams of a promoter component consisting of calcium iodide; 6 ml. of water and 69 ml. of glacial acetic acid as solvent; and 16.8 grams of hexene-1 having the structural formula $CH_3(CH_2)_3CH=CH_2$ as feedstock.

The reactor is pressurized with carbon monoxide to a total pressure of 700 p.s.i.a., corresponding to a carbon monoxide partial pressure of about 600 p.s.i.a. at the reaction temperature of 175° C. The reaction is carried out at constant pressure. The reaction mixture is subsequently analyzed by gas chromatographic techniques to yield a solution containing (solvent and catalyst-free bases):

| | Wt. percent |
|---|---|
| Hexenes | 16 |
| Iodohexane | 6 |
| Branched $C_7$ carboxylic acids | 55 |
| n-Heptanoic acid | 23 |

The selectivity to the desired carboxylic acid product (defined as moles of carboxylic acid/total moles of olefin and/or olefin derivative consumed×100) is greater than 98 mol percent at substantially 83% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

EXAMPLE 7

A batch reactor is charged with the following ingredients: 0.133 gram of a rhodium compound having the formula $RhCl_3 \cdot 3H_2O$, as catalyst precursor; 18.3 grams of a promoter component consisting of 47 wt. percent aqueous hydriodic acid; 37.8 ml. of glacial acetic acid as solvent; and 40.2 grams of cyclohexene having the formula $C_6H_{10}$ as feedstock.

The reactor is pressurized with carbon monoxide to a total pressure of 700 p.s.i.a., corresponding to a carbon monoxide partial pressure of about 575 p.s.i.a. at the reaction temperature of 175° C. The reaction is carried out at constant pressure.

The reaction mixture is subsequently analyzed by gas chromatographic techniques to yield a solution containing (solvent and catalyst-free bases):

| | Wt. percent |
|---|---|
| Cyclohexene | 2 |
| Cyclohexane carboxylic acid | 98 |

The selectivity to the desired carboxylic acid product (defined as moles of carboxylic acid/total moles of olefin and/or olefin derivative consumed×100) is virtually quantitative. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

EXAMPLE 8

A batch reactor is charged with the following ingredients: 0.133 gram of a rhodium compound having the formula $RhCl_3 \cdot 3H_2O$, as catalyst precursor; 18.3 grams of a promoter component consisting of 47 wt. percent aqueous hydriodic acid; 37.8 ml. of glacial acetic acid as solvent; and 38.6 grams of dodecene-6 having the structural formula $CH_3(CH_2)_4-CH=CH-(CH_2)_4CH_3$ as feedstock.

The reactor is pressurized with carbon monoxide to a total pressure of 700 p.s.i.a., corresponding to a carbon monoxide partial pressure of about 625 p.s.i.a. at the reaction temperature of 175° C. The reaction is carried out at constant pressure.

The reaction mixture is subsequently analyzed by gas chromatographic techniques to yield a solution containing (solvent and catalyst-free bases):

| | Wt. percent |
|---|---|
| Unreacted olefin feedstock | 6 |
| Intermediates | 10 |
| $C_{13}$ carboxylic acids | 84 |

The selectivity to the desired carboxylic acid product (defined a smoles of carboxylic acid/total moles of olefin and/or olefin derivative consumed×100) is greater than 96 mol percent at substantially 94% conversion level. No other organic oxygenated compounds such as alcohols, aldehydes, ketones, etc., are produced as determined by gas chromatographic analysis. No substantial amounts of

EXAMPLE 9

A batch reactor is charged with the following ingredients: 0.10 gram of a rhodium compound having the formula $RhCl_3 \cdot 3H_2O$, as catalyst precursor; 13.7 grams of a promoter component consisting of 47 wt. percent aqueous hydriodic acid; 65.9 ml. of glacial acetic acid as solvent; and 13 grams of 1,3-butadiene having the structural formula $CH_2=CH-CH=CH_2$ as feedstock.

The reactor is pressurized with carbon monoxide to a total pressure of 700 p.s.i.a., corresponding to a carbon monoxide partial pressure of about 525 p.s.i.a. at the reaction temperature of 175° C. The reaction is carried out at constant pressure. One mole of carbon monoxide is consumed per mole of diolefin charged.

The reaction mixture is subsequently analyzed by gas chromatographic techniques to yield a solution containing (solvent and catalyst-free bases) greater than 79 wt. percent $C_5$ carboxylic acids.

EXAMPLE 10

A batch reactor is charged with the following ingredients: 0.10 gram of a rhodium compound having the formula $RhCl_3 \cdot 3H_2O$, as catalyst precursor; 13.7 grams of a promoter component consisting of 47 wt. percent aqueous hydriodic acid; 40.9 ml. of glacial acetic acid as solvent; and 22 grams of isobutylene having the structural formula $(CH_3)_2C=CH_2$ as feedstock.

The reactor is pressurized with carbon monoxide to a total pressure of 700 p.s.i.a., corresponding to a carbon monoxide partial pressure of about 535 p.s.i.a. at the reaction temperature of 175° C. The reaction is carried out at constant pressure.

The reaction mixture is subsequently analyzed by gas chromatographic techniques to yield a solution containing (solvent and catalyst-free bases):

|                                              | Wt. percent |
|----------------------------------------------|-------------|
| Pivalic acid and isovaleric acids            | 10          |
| Miscellaneous intermediates and unreacted feedstock | 84   |
| Others                                       | 6           |

The selectivity to the desired carboxylic acid product (defined as moles of carboxylic acid/total moles of olefin and/or olefin derivative consumed $\times 100$) is greater than 69 mol percent at substantially 25% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

EXAMPLE 11

A batch reactor is charged with the following ingredients: 0.097 gram of a rhodium compound having the formula $Rh_2(CO)_4Cl_2$, as catalyst precursor; 9.5 grams of a promoter component consisting of methyl iodide; 5 ml. of distilled water and 45.8 ml. of glacial acetic acid as solvent; and 38.6 grams of dodecene-1 having the structural formula $CH_2=CH(CH_2)_9CH_3$ as feedstock.

The reactor is pressurized with carbon monoxide to a total pressure of 700 p.s.i.a., corresponding to a carbon monoxide partial pressure of about 625 p.s.i.a. at the reaction temperature of 175° C. The reaction is carried out at constant pressure.

The reaction mixture is subsequently analyzed by gas chromatographic techniques to yield a solution containing (solvent and catalyst-free bases):

|                              | Wt. percent |
|------------------------------|-------------|
| Unreacted olefin feedstock   | 9           |
| Miscellaneous intermediates  | 11          |
| $C_{13}$ carboxylic acids    | 80          |

The selectivity to the desired carboxylic acid product (defined as moles of carboxylic acid/total moles of olefin and/or olefin derivative consumed $\times 100$) is greater than 99 mol percent at substantially 80% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

EXAMPLE 12

A batch reactor is charged with the following ingredients: 0.10 gram of a rhodium compound having the formula $RhCl_3 \cdot 3H_2O$, as catalyst precursor; 13.7 grams of a promoter component consisting of 47 wt. percent aqueous hydriodic acid; 40.9 ml. glacial acetic acid as solvent; and 25 grams of vinyl chloride having the structural formula $CH_2=CH-Cl$ as feedstock.

The reactor is pressurized with carbon monoxide to a total pressure of 700 p.s.i.a., corresponding to a carbon monoxide partial pressure of about 535 p.s.i.a. at the reaction temperature of 175° C. The reaction is carried out at constant pressure.

The reaction mixture is subsequently analyzed by gas chromatographic techniques to yield a solution containing (solvent and catalyst-free bases) greater than 34 wt. percent propionic acid.

EXAMPLE 13

A batch reactor is charged with the following ingredients: 0.133 gram of a rhodium compound having the formula $RhCl_3 \cdot 3H_2O$, as catalyst precursor; 1.0 ml. of a promoter component consisting of 57 wt. percent aqueous hydriodic acid; 41.2 ml. of glacial acetic acid and 8 ml. $H_2O$ as solvent; and 33.6 grams of hexene-1 having the structural formula $H_2C=CH(CH_2)_3CH_3$ as feedstock.

The reactor is pressurized with carbon monoxide to a total pressure of 700 p.s.i.a., corresponding to a carbon monoxide partial pressure of about 600 p.s.i.a. at the reaction temperature of 175° C. The reaction is carried out at constant pressure.

The reaction mixture is subsequently analyzed by gas chromatographic techniques to yield a solution containing (solvent and catalyst-free bases):

|                                 | Wt. percent |
|---------------------------------|-------------|
| Hexenes                         | 22          |
| Miscellaneous intermediates     | 33          |
| n-Heptanoic acid                | 20          |
| Branched $C_7$ carboxylic acids | 25          |

The selectivity to the desired carboxylic acid product (defined as moles of carboxylic acid/total moles of olefin and/or olefin derivative consumed $\times 100$) is greater than 90 mol percent at substantially 50% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

When the above experiment is repeated in two separate tests except initially employing 0.6 ml. of 37% hydrochloric acid, or .75 ml. of 48% HBr (an equivalent molar ratio of Cl⁻ or Br to I⁻), no carbonylation reaction occurs as determined by gas chromatographic analysis of reaction mixture and carbon monoxide gas consumption data. When, after about 2 hours and no reaction has occurred, 1.0 ml. of HI is injected into the reactor, reaction begins immediately with no induction period as determined by carbon monoxide gas consumption. Subsequent analysis of the reaction mixture gives a product distribution similar to that above.

These results demonstrate that neither HCl nor HBr is effective as the promoter portion of the catalyst system of this invention.

EXAMPLE 14

A batch reactor is charged with the following ingredients: 0.097 gram of a rhodium compound having the formula [Rh(CO)₂Cl]₂, as catalyst precursor; 14.2 grams of a promoter component consisting of iodohexane; 61.3 ml. glacial acetic acid as solvent; and 19.3 grams of hexane-1 having the structural formula

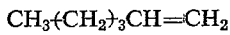

as feedstock.

The reactor is pressurized with carbon monoxide to a total pressure of 700 p.s.i.a., corresponding to a carbon monoxide partial pressure of about 610 p.s.i.a., at the reaction temperature of 175° C. The reaction is carried out at constant pressure.

The reaction mixture is subsequently analyzed by gas chromatographic techniques to yield a solution containing (solvent and catalyst-free bases):

| | Wt. percent |
|---|---|
| Unreacted hexenes and intermediates | 21 |
| Branched C₇ carboxylic acids | 53 |
| n-Heptanoic acid | 26 |

The selectivity to the desired carboxylic acid product (defined as moles of carboxylic acid/total moles of olefin and/or olefin derivative consumed×100) is greater than 99 mol percent at substantially 80% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

EXAMPLE 15

A batch reactor is charged with the following ingredients: 0.133 gram of a rhodium compound having the formula RhCl₃·3H₂O, as catalyst precursor; 15.0 grams of a promoter component consisting of 57 wt. percent aqueous hydriodic acid; 66.2 ml. glacial acetic acid as solvent; and 29.0 grams of allyl alcohol having the structural formula CH₂=CH—CH₂—OH as feedstock.

The reactor is pressurized with carbon monoxide to a total pressure of 700 p.s.i.a., corresponding to a carbon monoxide partial pressure of about 625 p.s.i.a. at the reaction temperature of 175° C. The reaction is carried out at constant pressure.

The reaction mixture is subsequently analyzed by gas chromatographic techniques to yield a solution containing (solvent and catalyst-free bases):

| | Wt. percent |
|---|---|
| Unreacted intermediates | 9 |
| n-Butyric acid | 51 |
| Isobutyric acid | 40 |

The selectivity to the desired carboxylic acid product (defined as moles of carboxylic acid/total moles of olefin and/or olefin derivative consumed×100) is greater than 90 mol percent at substantially 100% conversion level. No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

EXAMPLE 16

A solid supported catalyst containing a rhodium component and an iodide promoter dispersed upon an inert support is prepared in the following manner: An amount of 0.3 g. of rhodium chloride trihydrate, having the formula RhCl₃·3H₂O, is dissolved in 115 ml. of ethanol. The solution is warmed to 60° C., and carbon monoxide is bubbled through the solution until a pale yellow color is obtained indicating the presence of the monovalent complex. Then the solution is cooled and 20 ml. of 57 wt. percent hydriodic acid is added to the solution of the rhodium compound. Subsequently, the resulting solution is added to 20 ml. of an activated carbon (Pittsburgh Activated Carbon Co.). The excess solvent is evaporated using a rotary evaporator under vacuum. The resulting catalyst is vacuum dried at 60° C. for about 16 hours. The catalyst is then preheated in nitrogen at 200° C. for one hour.

Ten (10) ml. of the above supported catalyst is charged into an 18-inch Pyrex glass vertical reactor 30 mm. in diameter. The resulting catalyst bed, 2 cm. in depth, is covered with 100 ml. of inert packing as a preheater. Gaseous ethylene is supplied to the reactor and is subsequently converted to propionic acid at high selectivity. The process is conducted at a feed rate (moles per hour) of ethylene, 0.27; HI, 0.02; water, 0.28; and CO, 0.54. This feed mixture provides the water in a 3.7% molar excess relative to olefins. The pressure at which the gaseous reactants contact the supported catalyst is 500 p.s.i.a., corresponding to a carbon monoxide partial pressure of about 125 p.s.i.a. at a reaction temperature of 175° C.

The gaseous reactor effluent contains the desired carboxylic acid product, propionic acid, and unreacted ethylene, water, carbon monoxide and promoter. The selectivity of ethylene conversion to propionic acid is virtually quantitative.

EXAMPLE 17

A batch reactor is charged with the following ingredients: 0.133 gram of a rhodium compound having the formula RhCl₃·3H₂O, as catalyst precursor; 18.3 grams of a promoter component consisting of 47 wt. percent aqueous hydriodic acid; 37.8 ml. of glacial acetic acid as solvent; and 44 grams of cyclooctene having the structural formula

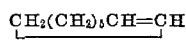

as feedsock.

The reactor is pressurized with carbon monoxide to a total pressure of 700 p.s.i.a., corresponding to a carbon monoxide partial pressure of about 645 p.s.i.a. at the reaction temperature of 175° C. The reaction is carried out at constant pressure.

The reaction mixture is subsequently analyzed by gas chromatographic techniques to yield a solution containing (solvent and catalyst-free bases) 66 wt. percent cyclooctane carboxylic acid.

EXAMPLE 18

A batch reactor is charged with the following ingredients: 0.133 gram of a rhodium compound having the formula RhCl₃·3H₂O, as catalyst precursor; 18.3 grams of a promoter component consisting of 47 wt. percent aqueous hydriodic acid; 34.8 ml. of glacial acetic acid as solvent; and 45 grams of 1,5-cyclooctadiene.

The reactor is pressurized with carbon monoxide to a total pressure of 700 p.s.i.a., corresponding to a carbon monoxide partial pressure of about 650 p.s.i.a. at the reaction temperature of 175° C. The reaction is carried out at constant pressure.

The reaction mixture is subsequently analyzed by gas chromatographic techniques to yield a solution containing (solvent and catalyst-free bases) 77 wt. percent cyclooctane carboxylic acid.

EXAMPLE 19

A batch reactor is charged with the following ingredients: 0.10 gram of a rhodium compound having the formula RhCl₃·3H₂O, as catalyst precursor; 13.6 grams of a promoter component consisting of 47 wt. percent aqueous hydriodic acid; 40.1 ml. of glacial acetic acid as solvent; and 17.8 grams of 2,4-hexadiene having the structural formula CH₃—CH=CH—CH=CH—CH₃ as feedstock.

The reactor is pressurized with carbon monoxide to a total pressure of 700 p.s.i.a., corresponding to a carbon monoxide partial pressure of about 575 p.s.i.a. at the reaction temperature of 175° C. The reaction is carried out at constant pressure.

The reaction mixture is subsequently analyzed by gas chromatographic techniques to yield a solution containing (solvent and catalyst-free bases) 10 wt. percent $C_7$ monocarboxylic acids.

EXAMPLE 20

A batch reactor is charged with the following ingredients: 0.133 gram of a rhodium compound having the formula $RhCl_3 \cdot 3H_2O$, as catalyst precursor; 18.3 grams of a promoter component consisting of 47 wt. percent aqueous hydriodic acid; 52.2 ml. of glacial acetic acid as solvent; and 25 grams of 1,5-hexadiene having the structural formula $CH_2=CH(CH_2)_2CH=CH_2$ as feedstock.

The reactor is pressurized with carbon monoxide to a total pressure of 700 p.s.i.a., corresponding to a carbon monoxide partial pressure of about 575 p.s.i.a. at the reaction temperature of 175° C. The reaction is carried out at constant pressure.

The reaction mixture is subsequently analyzed by gas chromatographic techniques to yield a solution containing (solvent and catalyst-free bases) 56 wt. percent $C_7$ monocarboxylic acids.

EXAMPLE 21

A batch reactor is charged with the following ingredients: 0.133 gram of a rhodium compound having the formula $RhCl_3 \cdot 3H_2O$, as catalyst precursor; 18.3 grams of a promoter component consisting of 47 wt. percent aqueous hydriodic acid; 37.8 ml. of glacial acetic acid as solvent; and 40 grams of isomeric dodecenes as feedstock.

The reactor is pressurized with carbon monoxide to a total pressure of 700 p.s.i.a., corresponding to a carbon monoxide partial pressure of about 625 p.s.i.a. at the reaction temperature of 175° C. The reaction is carried out at constant pressure.

The reaction mixture is subsequently analyzed by gas chromatographic techniques to yield a solution containing (solvent and catalyst-free bases) 79 wt. percent $C_{13}$ carboxylic acids.

EXAMPLE 22

A glass lined reactor is charged with the following ingredients: 0.35 gram of a rhodium compound having the formula $Rh(CO)Cl(P\phi_3)_2$, as catalyst precursor; 12 ml. of water and a promoter component consisting of 8.5 grams of elemental iodine; 38 ml. of glacial acetic acid as solvent; and 33 grams of hexene-1 having the structural formula $CH_2=CH(CH_2)_3CH_3$ as feedstock.

The reactor is pressurized with carbon monoxide to a total pressure of 700 p.s.i.a., corresponding to a carbon monoxide partial pressure of about 600 p.s.i.a. at the reaction temperature of 175° C. The reaction is carried out at constant pressure.

The reaction mixture is subsequently analyzed by gas chromatographic techniques to yield a solution containing substantially the same product distribution as in Example 6.

When the above experiment is repeated in separate tests employing as the catalyst precursor and promoter component (added as equivalent molar quantities), the following compounds:

$RH(CO)Cl(P\varphi_3)_2$ and $Br_2$
$Rh(CO)Cl(P\varphi_3)_2$ and $Cl_2$
$Rh(CO)Br(P\varphi_3)_2$ and $Cl_2$ no carbonylation reaction, yielding carboxylic acid products, occurs.

EXAMPLE 23

A batch reactor is charged with the following ingredients: 0.133 gram of a rhodium compound having the formula $RhCl_3 \cdot 3H_2O$, as catalyst precursor; 18.3 grams of a promoter component consistnig of 47 wt. percent aqueous hydriodic acid; 38 ml. of glacial acetic acid as solvent; and 40 grams of 1,5,9-cyclododecatriene as feedstock.

The reactor is pressurized with carbon monoxide to a total pressure of 500 p.s.i.a., corresponding to a carbon monoxide partial pressure of about 415 p.s.i.a. at the reaction temperature of 140° C. The reaction is carried out at constant pressure.

The reaction mixture is subsequently analyzed by gas chromatographic techniques to yield a solution containing (solvent and catalyst-free bases):

|  | Wt. percent |
|---|---|
| Unreacted olefin feedstock | 6 |
| Intermediates and others | 12 |
| Cyclododecane carboxylic acid | 82 |

The selectivity to the desired carboxylic acid product is greater than 95 mol percent at substantially 85% conversion level.

What is claimed is:

1. A process for the transformation of an ethylenically unsaturated compound, having from 2 to 30 carbon atoms, and containing the structural unit

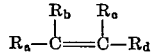

in aliphatic, acyclic, or cycloaliphatic form, where $R_a$, $R_b$, $R_c$ and $R_d$ are moieties having from 0 to 20 carbon atoms and are selected from the group consisting of hydrogen, halogen, alkyl, alkene, aryl, cycloalkyl and cycloalkene moieties, to obtain a carboxylic acid, which comprises contacting the said compound with carbon monoxide and water in the presence of a rhodium compound, and an iodide promoter, at a temperature of from 50° C. to 300° C.

2. A process as in claim 1 in which the said promoter is hydrogen iodide.

3. A process as in claim 1 in which the partial pressure of carbon monoxide is from 1 p.s.i.a. to 15,000 p.s.i.a.

4. A process as in claim 1 in which the partial pressure of carbon monoxide is from 5 p.s.i.a. to 3,000 p.s.i.a.

5. A process as in claim 1 in which the partial pressure of carbon monoxide is from 25 p.s.i.a. to 1,000 p.s.i.a.

6. A process as in claim 1 in which the said rhodium compound is a rhodium halide.

7. A process as in claim 1 in which the said rhodium compound is a rhodium carbonyl halide.

8. A process as in claim 1 in which the said rhodium compound is rhodium trichloride.

9. A process as in claim 1 in which the said rhodium compound is rhodium triiodide.

10. A process as in claim 1 in which the said rhodium compound contains carbon monoxide and at least one iodine ligand.

11. A process for the transformation of an ethylenically unsaturated compound, having from 2 to 30 carbon atoms, and containing the structural unit

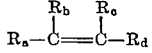

in aliphatic, acyclic, or cycloaliphatic form, where $R_a$, $R_b$, $R_c$ and $R_d$ are moieties having from 0 to 20 carbon atoms and are selected from the group consisting of hydrogen, halogen, alkyl, alkene, aryl, cycloalkyl and cycloalkene moieties, to obtain a carboxylic acid, which comprises contacting the said compound with carbon monoxide and water in the presence of a solution containing a rhodium compound, and an iodide promoter at a temperature of from 50° C. to 300° C., and at a carbon monoxide partial pressure of from 1 p.s.i.a. to 15,000 p.s.i.a.

12. A process for the manufacture of carboxylic acids which comprises contacting an ethylenically unsaturated feedstock of from 2 to 30 carbon atoms with carbon monoxide and water, in the presence of a solution containing a rhodium compound, and an iodide promoter at a temperature of from 125° C. to 250° C.

13. A process as in claim 11 in which the said compound feedstock is comprised of an olefin having from 10 to 20 carbon atoms, and the product comprises a monocarboxylic acid.

14. A process as in claim 11 in which the said compound feedstock is comprised of a mixture of olefins having from 10 to 20 carbon atoms, and the product is comprised of monocarboxylic acids.

15. A process as in claim 11 in which the said compound feedstock comprises a cyclic hydrocarbon of 6 to 12 carbon atoms, and which contains from 1 to 3 ethylenically unsaturated structural units, and the product comprises a monocarboxylic acid derivative of the said cyclic hydrocarbon.

16. A process as in claim 11 in which the said promoter is hydrogen iodide.

17. A process as in claim 11 in which the said rhodium compound is a rhodium halide.

18. A process as in claim 11 in which the said rhodium compound is a rhodium carbonyl halide.

19. A process as in claim 11 in which the said rhodium compound is rhodium trichloride.

20. A process as in claim 11 in which the said rhodium compound is rhodium triiodide.

21. A process as in claim 11 in which the said feedstock is ethylene and the product is propionic acid.

22. A process as in claim 11 in which the said rhodium compound contains carbon monoxide and at leaest one iodine ligand.

23. A process for the transformation of an ethylenically unsaturated compound, having from 2 to 30 carbon atoms, and containing the structural unit

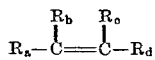

in aliphatic, acyclic, or cycloaliphatic form, where $R_a$, $R_b$, $R_c$ and $R_d$ are moieties having from 0 to 20 carbon atoms and are selected from the group consisting of hydrogen, halogen, alkyl, alkene, aryl, cycloalkyl and cycloalkene moieties, to obtain a carboxylic acid, which comprises contacting the said compound with carbon monoxide and water, in the vapor phase, in the presence of a rhodium compound, and an iodide promoter, at a temperature of from 50° C. to 300° C. and at a carbon monoxide partial pressure of 1 p.s.i.a. to 15,000 p.s.i.a.

24. A process for the transformation of an ethylenically unsaturated compound to obtain a carboxylic acid which comprises contacting the said compound with carbon monoxide and water in the presence of a rhodium compound and an iodide promoter at a temperature of from 50° C. to 300° C.

25. A process for the transformation of ethylene to obtain propionic acid, which comprises contacting the said ethylene with carbon monoxide and water in the presence of a rhodium compound, and an iodide promoter at a temperature of from 50° C. to 300° C.

References Cited

UNITED STATES PATENTS

| | | | |
|---|---|---|---|
| 2,710,879 | 6/1955 | Snyder | 260—532 |
| 3,065,242 | 11/1962 | Alderson et al. | 260—343.6 |
| 3,168,553 | 2/1965 | Slaugh | 260—497 |
| 3,409,649 | 11/1968 | Keblys et al. | 260—413 |
| 3,527,809 | 9/1970 | Pruett et al. | 260—604 |

LEWIS GOTTS, Primary Examiner

E. G. LOVE, Assistant Examiner

U.S. Cl. X.R.

260—326.3, 327, 347.3, 397.1, 514, 533, 515